United States Patent Office 3,093,616
Patented June 11, 1963

3,093,616
1,1'-THIOBIS(6-α,α-DIMETHYLBENZYL-2-NAPHTHOL)
Christos Savides, New Brunswick, N.J., assignor to American Cyanamid Company, New York, N.Y., a corporation of Maine
No Drawing. Filed Aug. 28, 1961, Ser. No. 134,144
2 Claims. (Cl. 260—45.95)

This invention relates to a new antioxidant for polypropylene plastics and to polypropylene compositions containing said antioxidants. More specifically, this invention relates to the compound of the formula:

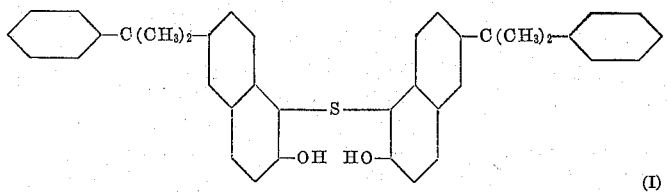

(I)

and also to polypropylene compositions containing from 0.001 to 5.0% by weight of said compound.

Polypropylenes are becoming increasingly important in the field of resins and plastics. Their peculiar properties, especially their resistance to chemical attack by many ordinary agents, make them particularly desirable in the manufacture of many kinds of artifacts, both utilitarian and decorative. However, they show one serious weakness. This is their susceptibility to oxidation by oxygen in the air. To the extent that this oxidation is photo-catalyzed it can be reduced by the inclusion of an ultraviolet absorber. However, the reaction is not entirely photo-induced. The mere exposure to air causes oxidation which physically yellows and brittles the resins and which causes the formation of carbonyl groups in the polymer chain.

Various kinds of antioxidants have been known to the chemical trade especially in the rubber and plastics field. Among the types of compounds which have been used as antioxidants have been various kinds of amines, phenols, thioethers, disulfides, thiols and the like. However, these are not completely satisfactory. There is a need for an improved antioxidant for polypropylenes which will give much longer protection to the resin.

It has been found that the compound of Formula I is a remarkably effective antioxidant for polypropylene resin compositions. Such enhanced protection for polypropylenes is extremely surprising in view of the fact that known bis-(2-hydroxy-naphthyl) sulfides provide better protection for other polyolefins than does the compound of Formula I. The compound of Formula I is distinctive in its ability to protect polypropylenes against oxidation.

The compound of this invention is most conveniently prepared by reacting 6-α,α-dimethylbenzyl-2-naphthol with sulfur dichloride. The reaction is preferably carried out in a hydrocarbon solvent, such as toluene, ether, or heptane, by application of heat until the reaction is completed in a reasonable time. Thus the temperatures may range from 40° to 120° C. or more. The reaction temperature is usually set by the refluxing temperature of the reaction mixture.

Polypropylene compositions which can be treated in accordance with this invention must contain at least 85% polypropylene to take advantage of the enhanced activity of the compound of Formula I. The latter should be used in said compositions in the proportions of 0.001 to 5.0% of the weight thereof, with 0.05 to 2.0% being preferred.

The testing of compounds as antioxidants is carried out experimentally by methods known to the art. These comprise principally the measurement of the time necessary for the absorption of oxygen by a plastic formulation containing the antioxidants to be tested, and the determination, by means of infrared spectra, of the magnitude of carbonyl formation. In the first method, a film sample containing the antioxidant tested, is subjected to pure oxygen at one atmosphere at 140° C. In the second method the film is placed in an oven at 140° C. and air is circulated over it. The results from both tests are normally reported as an induction period (i.e. the number of hours of protection afforded to the resin sample before rapid oxidation commences). In the case of the "carbonyl" method, the amount of oxidation is measured by the infrared absorption of the film sample at 5.8 to 5.9 microns. Another significant piece of data in measuring the oxidation is the time required for the sample to absorb 10 milliliters of oxygen per gram of resin.

An important property of the antioxidant of this invention is that it gives even more protection to polypropylene containing carbon black than is obtainable otherwise.

This invention can be illustrated by the following examples in which parts are by weight, unless otherwise specified, and parts by volume are to parts by weight as milliliters are to grams.

EXAMPLE 1

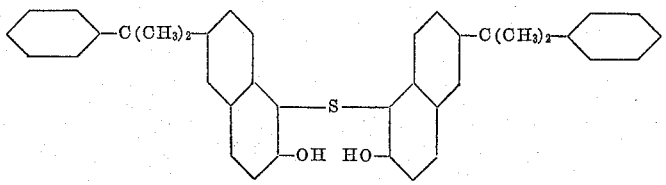

A solution of 1.0 part of sulfur dichloride in 50 parts by volume of heptane is added dropwise to a solution of 4.0 parts of 6-α,α-dimethylbenzyl-2-naphthol at 80°. The latter is prepared by the reaction of 2-naphthol and α-methylstyrene, according to the procedure described in J. Org. Chem., 17, 243 (1952). The reaction mixture is stirred until the reaction is substantially complete. The precipitate which forms is filtered, washed with heptane and air dried. The product, 1,1'-thiobis(6-α,α-dimethylbenzyl-2-naphthol) is purified by recrystallization from benzene.

EXAMPLE 2

A sample of the product of Example 1 is tested in polypropylene for the rate of carbonyl formation in films placed in an air-circulating oven at 140° C. The results are reported as an induction period, i.e., the number of hours of protection afforded to the resin sample before rapid oxidation commences. The actual numerical values are obtained by extrapolation of the steep portion of an oxidation curve, constructed by plotting the amount of oxidation vs. time, to the time axis at "zero oxidation." The amount of oxidation in this test is measured by the infrared absorbance of the film samples at 5.8 to 5.9 microns.

For purposes of comparison, other 1,1'-thiobis(6-R-2-naphthols) were tested under identical conditions. Using the polypropylene film of the same dimensions and composition test compounds in each case were incorporated into polyproylene samples by first milling for about four minutes on a two-roll heated (front roll at 320° F., back roll at 375° F.) mill and then compress-molding at 350° F. under 25 tons pressure for seven minutes. In each case 0.2% of the test compound on the weight of the polypropylene was employed.

The following table summarizes the results of these tests.

*Carbonyl Induction Period in Stabilized Polypropylene*

| No. | Antioxidant | Induction period (hrs.) |
|---|---|---|
| 1 | 1,1'-thiobis(6-α,α-dimethylbenzyl-2-naphthol) | 425 |
| 2 | 1,1'-thiobis(6-α-methylbenzyl-2-naphthol) | 160-175 |
| 3 | 1,1'-thiobis(6-t-octyl-2-naphthol) | 175-190 |
| 4 | 1,1'-thiobis(6-t-butyl-2-naphthol) | 183-190 |
| 5 | 1,1'-thiobis(6-α-methylcyclohexyl-2-naphthol) | 250-280 |
| 6 | 1,1'-thiobis(6-cyclohexyl-2-naphthol) | 258 |

The foregoing example shows the enhanced antioxidant activity of the compound of the present invention in polypropylene. The following example, for illustrative purposes, compares the antioxidant activities of the compound of this invention with similar compounds in a polyethylene medium.

EXAMPLE 3

Samples of polyethylene films three to five mils thick, cast from a xylene solution containing 0.1% of antioxidant are tested for carbonyl formation by the procedure outlined in Example 2. The films are of the same dimensions in all cases, The following table summarizes the results of these tests.

*Carbonyl Induction Period in Stabilized Polyethene*

| No. | Antioxidant | Induction period (hrs.) |
|---|---|---|
| 1 | 1,1'-thiobis(6-α,α-dimethylbenzyl-2-naphthol) | 75 |
| 2 | 1,1'-thiobis(6-α-methylbenzyl-2-naphthol) | 78 |
| 3 | 1,1'-thiobis(6-t-octyl-2-naphthol) | 55.8 |
| 4 | 1,1'-thiobis[6-(1-methylcyclohexyl)-2-naphthol] | 55 |
| 5 | 1,1'-thiobis(6-cyclohexyl-2-naphthol) | 81 |

This application is a continuation-in-part of application Serial No. 863,127, filed December 31, 1959, now abandoned.

We claim:
1. A compound of the formula:

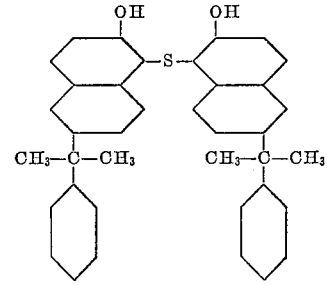

2. Polypropylene compositions containing from 0.001 to 5.0% by weight of a compound of the formula:

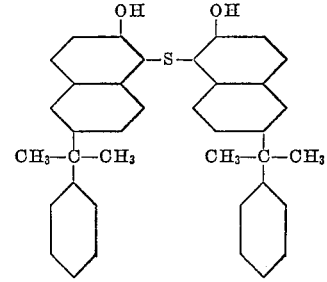

References Cited in the file of this patent
UNITED STATES PATENTS
2,967,846    Hawkins et al. _____ Jan. 10, 1961